Sept. 8, 1970    J. A. BARILE    3,527,679
MOLDED REUSABLE MASKING FOR SELECTIVE COATING, PARTICULARLY
ELECTROPLATING
Filed Jan. 19, 1968

INVENTOR
JOSEPH A. BARILE

BY
ATTORNEYS

United States Patent Office 3,527,679
Patented Sept. 8, 1970

3,527,679
MOLDED REUSABLE MASKING FOR SELECTIVE COATING, PARTICULARLY ELECTROPLATING
Joseph A. Barile, Hollywood, Fla., assignor to Aerodex, Inc., Miami, Fla., a corporation of Delaware
Filed Jan. 19, 1968, Ser. No. 699,252
Int. Cl. B44d 1/14; C23b 5/48
U.S. Cl. 204—15                                                  7 Claims

ABSTRACT OF THE DISCLOSURE

A close tolerance metal part having regions requiring building up or replacement of portions of metal depleted by wear, and other regions which require no building up or replacement during the particular coating step, is supported, a liquid synthetic liquid flexible polymer or elastomer, e.g. silicone rubber, is flowed over said regions which require no buildup or replacement and confined to said regions during cure to form a masking body. The exposed regions of the part are coated, e.g. by electroplating, and the cured flexible polymer or elastomer masking body is removed from the part. The thickness of the masking body is such that when removed from the part it is generally self-supporting. In assembly line repair of similar parts, the masking body removed from the first of such parts may be removably reused on the remainder of such parts during the selective coating of the exposed regions of the remainder of such parts.

BACKGROUND OF THE INVENTION

Many close tolerance parts, for instance aircraft engine parts, which have regions that are below tolerance either due to such parts having been manufactured in an undersize condition, or due to their having had portions worn away or depleted during use of such parts, remain sufficiently valuable that there is an economic need for repairing and salvaging such parts by providing some way to bring the below tolerance regions up to tolerance. Much of such repair, especially of precision metal parts, is the province of the electroplating industry wherein it was early learned that much of the economic attractiveness of such salvaging and repairing processes is dissipated if in building up under-tolerance surfaces, other precision surfaces are also built up and must be ground back to tolerance, tested and treated. The waste in such instances also includes waste of the plating metal applied where not needed.

From this need to prevent waste in order to preserve the economic attractiveness of salvage and repair of such parts grew the technique of selectively masking regions of the parts which are not to be plated. Selective masking is also employed in instances in which, during one step, some regions of the part are to be coated with a first material and during another step, other regions of the part are to be coated with another material. In order to perform satisfactorily the masking material must (a) be able to survive in the environment of the plating process and (b) not accept a significant coating of the plating metal such as would deplete the plating bath or waste the plating metal.

Prior art masking material used in such selective masking includes masking tape, wax and thin, strippable coatings of rubber or other plastic material, all characterized by being destroyed in being removed from the part.

Masking tape usually consists of a long strip of creped kraft paper having pressure sensitive adhesive on at least one face and supplied in a convolute wound condition on a tubular support. Use of such tape in selective masking comprises winding the tape from its tubular support and onto the part in such sense as to encase certain regions of the part with intercalated multiple wraps of the tape, mummy fashion. This task is time consuming and the result less reliable with increasing complexity of the topography of the regions to be masked. Removal of the masking tape after plating involves unwinding it from the part and disposing of it, since the tape is not subject to reuse.

Masking part regions with wax involves selecting a wax which (a) is substantially inert respecting the plating environment, (b) can be melted and flowed onto the part regions, but will remain frozen, i.e. will not flow or run during plating and (c) can be removed from the part after plating. Again, time spent in preparing selective masking through application of wax masks is great in relation to the benefits obtained, since peeling or dissolving the wax from the parts to remove these masks after plating destroys them and the whole operation of mask preparation must be repeated when additional parts are to be selectively masked.

The selective masking of parts with painted on or sprayed on thin, strippable coats of rubber or rubbery plastics involves a similar destructive removal of the masking cots after plating.

SUMMARY OF THE INVENTION

Thus it is a primary object of the invention to provide means and a method for selective masking of a plurality of similar close tolerance parts, e.g. to allow electroplating of exposed regions of the parts including: flowing liquid settable or curable rubber or rubbery plastic over the regions to be masked, allowing the mask to set or cure, plating the exposed regions of the part, removing the mask in an intact condition, installing the mask about a similar part and plating the exposed regions of the latter part.

BRIEF DESCRIPTION OF THE DRAWING

The principles of the invention will be further hereinafter discussed with reference to the drawing wherein a preferred embodiment is shown. The specifics illustrated in the drawing are intended to exemplify, rather than limit, aspects of the invention as defined in the claims.

IN THE DRAWING

Figure 1:
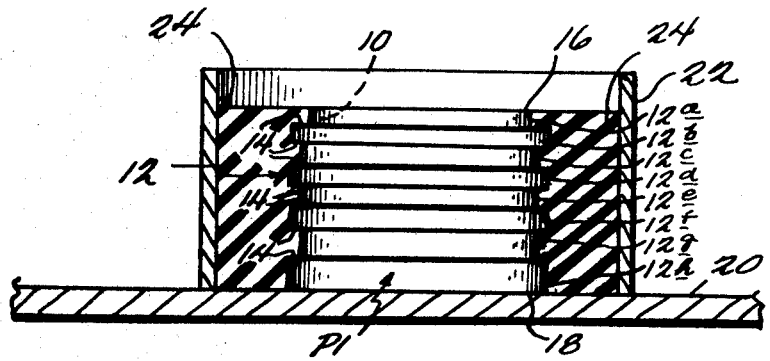

FIG. 1 is a longitudinal cross sectional view showing casting in situ of a mask about selected regions of a part, in accordance with the present invention.

Figure 2:
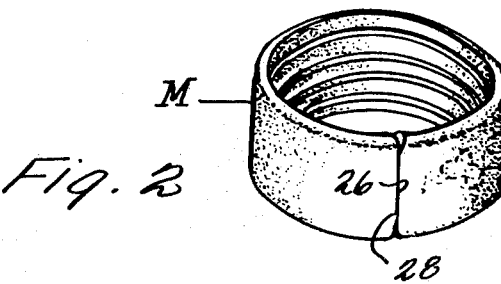

FIG. 2 is a perspective view of the mask of FIG. 1 after removal from the part of FIG. 1, subsequent to plating of the exposed regions of the part of FIG. 1.

Figure 3:
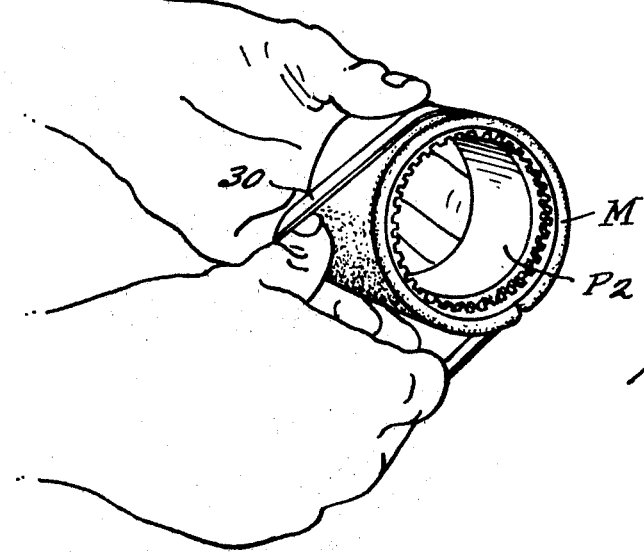

FIG. 3 is a perspective view showing assembly of the mask on a subsequent, similar part.

In FIG. 1, a precision, close tolerance aircraft part P1 is shown. The part P1 is generally tubular, having a longitudinal bore 10 and a volute exterior 12 shown comprising a series of circumferential, coaxially extending bands 12a through 12h of varying diameter and axial extent. Radial, axially facing shoulders 14 join adjacent bands. In the embodiment of FIGS. 1–3, the coating operation is to consist of coating the internal peripheral surface of the bore 10 and the opposite annular end surfaces 16, 18 of the part. In the process, the part P1 is supported on a flat surface 20 on one end 18. A tubular sidewall member 22 is placed about the part P1, the inside diameter or width of the tubular sidewall member being such that there is a minimum clearance between the sidewall member 22 and the part P1 of at least ⅛ inch, preferably about ¼ inch. In FIG. 1, the sidewall member 22 is shown consisting of a separate element which rests upon the flat surface 20 surrounding the part P1, thus the sidewall member 22 may consist of a discarded container sidewall, a spirally wound, cardboard, cylindrical mailing tube or the like. In instances where the sidewall member 22 is the sidewall of a container, such as a can, drum or bucket, the surface 20 may be conveniently provided by the inside of an integral bottom wall of the container.

A pourable or trowelable rubber or rubbery plastic composition 24 is poured or troweled into the annulus between the volute exterior of the part P1 and the internal surface of the sidewall. Setting and curing of the rubber or rubbery plastic material is accomplished and then the sidewall member 22 is removed, for instance by cutting it away or by sliding the masked part away from the sidewall member 22 and surface 20 leaving the set and cured rubber or rubbery plastic material in place on the part P1 as a mask M.

The part P1 is then placed on a conventional electroplating rack, lowered into a conventional electroplating bath, selectively plated in the exposed regions 10, 16, 18 while the masked regions 12a–12h and 14 remain unplated. After removal from the plating bath, the mask M is removed in an intact condition from the selectively plated part M1. In instances where the masked surface of the part is not very complex, the mask may be worked free and wriggled off the part in view of the elasticity of the mask. In instances where the exterior of the part is so complex or voluted that there is a high likelihood that the mask might rip if removal by elastically stretching the mask were attempted, the mask may be cut so it may be more easily removed. In FIG. 2 the mask M has been removed from the part P1 by slicing generally radially through the mask along a line generally parallel to the longitudinal axis of the part P1, grasping the mask M at the edges 26, 28 so formed and elastically enlarging the mask sufficiently to free it from the part P1.

To install the mask M on a subsequent part P2 for performing a similar plating of selective regions thereof, the mask, if unsliced, is wriggled into place on the part P2, and if sliced, is elastically enlarged by gripping the edges 26, 28 and moving them arcuately away from one another, the part inserted and the mask allowed to return, elastically, to its unstressed shape. For holding the sliced mask about the part P2, should the restorative force of the mask material be insufficient, a heavy duty rubber band, short circlet of tire inner tube or similar elastic hoop 30 may be circumferentially stretched over the mask M as shown in FIG. 3. The part P2 may then be selectively electroplated, much as the part P1, and, thereafter, the mask M removed in a reverse of the steps of installation thereof. The mask M may be similarly, successively used on a large number of parts P.

It should be apparent that the mask M need not circumferentially surround the part to be plated. For instance, were it the bore 10 which were volute, and the exterior 12a–12h and 14 the surfaces to be plated, a smaller sidewall member would be inserted in the bore 10, and masking material flowed into the annulus between such smaller sidewall member and the bore 10, thus the part would surround the mask. Such mask would be similarly used, removed and installed on subsequent similar parts.

In casting the mask on the part P1, should the mask cover portions of regions which are intended to be plated, the mask may be trimmed back, for instance with a razor blade, to expose all of the desirably exposed regions. In such manner, complex selective masks may be quickly made, even including one or more windows W (shown in dashed lines in FIG. 2) cut through the mask to expose isolated regions which are also intended to be plated.

Although often unnecessary, release agents of conventional type may be applied to the parts prior to pouring of the mask, should this be desired.

For the rubber or rubbery plastic material 24, the presently preferred material is Silastic 589 RTV silicone rubber mixed according to the manufacturer's instructions with Silastic 589 catalyst. Silastic is a registered trademake of Dow Corning Corporation, Midland, Mich.; the manufacturer of the material. The manufacturer's instructions for preparation and use of Silastic 589 RTV silicone rubber, as they appear on the label, are as follows:

"Silastic 589 RTV must be mixed with a catalyst just before using. Four parts of catalyst 589 are used to 100 parts of fluid rubber (by weight), a 1:25 ratio.

"Silastic 589 RTV rubber and its catalyst can be mixed together by either manual or mechanical stirring.

"Catalyst 589 is white, while the rubber is red; which makes it easy to determine when the two are uniformly mixed. To facilitate mixing, the catalyst has the same consistency as the fluid rubber.

"Care should be taken during catalyst addition to avoid mixing in excess air. The inclusion of air during mixing may cause voids in the finished mold. The application of vacuum to a catalyzed rubber is an excellent method of removing air.

"Working time:

While catalyst material begins to vulcanize immediately after mixing it remains workable for about 4 hours at room temperature. To take advantage of maximum flowability molds should be poured within 1½ hours after catalyst addition. Average working times at various temperatures are given below.

| Temperature, ° F.: | Time |
| --- | --- |
| 100 | 1½ hours. |
| 77 | 4 hours. |
| 40 | 6 hours. |
| −30 | More than 1 week. |

"The amount of catalyst added determines working time and cure time. For example, when one-half the recommended amount of catalystis added, the working time is almost doubled, and vulcanization time to tack free stage is extended about 30%. Physical properties are not significantly affected and the material will be set up in 24 hours. When twice the amount of recommended catalyst is added, the working time is shortened by about 20% vulcanization time to tack-free stage is shortened by about 40%. Physical properties are not significantly affected.

"Approximately twice the recommended amount of pretested catalyst is supplied with each order."

Room temperature vulcanizing silicon rubber is preferred in view of the ease and speed with which masks may be cast, set and cured using it, the durability and satisfactory elasticity of masks made from it, and the commercial availability of the material.

Silicone rubber which vulcanizes at room temperature is largely made up of dimethylsiloxanes, but the gum also contains active sites such as those in some of the reactive types of silicon fluids: SiH, SiOH, or $SiOC_2H_5$. These room temperature vulcanizing compounds cure by the formation of siloxane crosslinks. Organic peroxides are usually used for curing silicon rubber compounds, benzoyl peroxide, dichlorobenzoyl, peroxide, t-butyl perbenzoate and di-tert-butyl peroxide being examples. A further discussion of the chemistry of silicone rubbers appears in Meals and Lewis, Silicones, Reinhold Publishing Corp. (1959) pp. 88–121 and 130–135, to which those interested may turn for reference.

Example 1

Several precision dimension aircraft parts similar to the one depicted in FIG. 1 were selectively plated in the bores thereof in the following manner. Six of the parts were each on end centrally in separate empty cylindrical cans so as to each rest on the bottom of the respective can. Silastic 589 RTV silicone rubber was mixed with Silastic 589 catalyst in accordance with the manufacturer's instructions, as copied hereinabove. This silicone rubber was poured into the annulus in each can between the part and the can sidewall up to the upper end of the respective part, the annulus being at least about one-fourth inch thick where thinnest. The rubber was allowed to congeal and cure to a durometer (Shore A) of about 65 which required about 24 hours, whereupon the parts with the masks so formed were removed from the cans and excess rubber trimmed away with a razor blade.

The six selectively masked parts were placed on a rack and immersed in an electroplating bath having the following constituents, by weight:

| Constituent: | Amount Oz./gal. |
| --- | --- |
| Sodium stannate | 8–14 |
| Caustic soda | 1–2 |
| Sodium acetate | 3 |
| Hydrogen peroxide | As required |

The bath was maintained at a temperature of 160° F. and the electric current therein was 4 volts DC, 25 amperes. After 10 minutes in the plating bath the selectively plated parts were removed. The parts were rinsed and the masks sliced radially through along longitudinal planes as shown in FIG. 2 and the masks removed from the parts, each in one piece. The six masks were then each reassembled about additional ones of the parts to be plated and secured in place with encircling heavy duty rubber bands (FIG. 3). The second group of six selectively masked parts were plated in a manner similar to the first and the masks thereafter removed. Reuse of the masks was continued until the run of parts to be selectively plated had been completed. In so doing each of the masks was used about 15 times, after which none showed any signs of deteriorating. Upon later occasion, when similar parts were to be selectively plated, these masks were still serviceable and usable leading to the projected indication that their average life is 2 months during which they may each be reused about 125 times.

The average time required to make each of the six masks was 20 minutes, including the time needed to trim it and to remove it from the part upon which it was cast. In contrast, the average time needed to assemble and disassemble a conventional masking tape mask about such a part is 5 minutes, but the latter mask is destroyed during removal and cannot be reused; the average time needed to assemble and disassemble a wax mask about such a part is 10 minutes, but it cannot be reused either. Thus, the advantages provided by the mask of the invention are capped by the ease with which it may be reused.

To assemble a mask prepared according to this example about a subsequent part and to disassemble it from that part requires about 1 minute. Thus, as the number of times the mask prepared according to the invention increases, the closer the average time of assembling and disassembling the mask on and from parts approaches the latter figure, representing a great saving of time, human effort and monetary expense compared with the methods of selective masking in current use.

Room temperature vulcanizing silicone rubber is the preferred material for fabricating the masking disclosed herein, because of the ease and speed with which it may be used. Under industrial conditions, in safety, and without need for expensive, difficult to obtain, or sophisticated equipment and the inertness and durability of the masking made therefrom. However, it is contemplated that other materials could be used such as silicone rubbers which must be cured at elevated temperatures, exemplified by those disclosed in Silicones, supra, and other rubbers or rubbery plastic materials which may be poured or troweled into place, then caused or allowed to congeal, set and cure to the rubbery state.

The rubbery state is defined by Lenz in Organic Chemistry of Synthetic High Polymers, Interscience Publishers, N.Y. (1967), pp. 28, 29, as follows:

"It is virtually axiomatic that the glass transition temperature in any polymer which serves as a useful rubber must fall well below room temperature or at least below its service temperature. Although the sample is no longer brittle just above $T_g$, its properties are more leathery than rubbery. It is only at temperatures 50° or more above $T_g$ that polymer segmental motions become sufficiently rapid to satisfy the practical requirements of rapid elongation and retraction with little energy dissipation in viscous work. The following are the additional requirements that any practical rubber must fulfill: (1) the original molecular weight must be high enough to permit long-range extensibility; (2) the polymer chain should contain units which are capable of being crosslinked to eliminate flow; (3) either by the addition of a reinforcing agent, for example, carbon black, or by orientation-induced crystallization, as in natural rubber, the rubber must develop a sufficiently high tensile strength when stretched. In certain of the newer rubbery polymers, the interchain interaction of specific regions of the polymer molecule replaces the need for covalent crosslinks, as for example, in the interaction between the highly polar sections of the polyurethane molecules or the extended block polystyrene segments of styrene-butadiene block copolymers.

"The tensile strength of a lightly crosslinked natural rubber is about 3 kg./mm.$^2$ when calculated as the force at break per unit area of the original cross section. When the 700% extension at break is taken into account and the tensile strength calculated on unit area of the cross section at break, the resulting value of 21 kg./mm.$^2$ is almost 40% as high as the average tensile strength of nylon fibers."

Accordingly, elastomeric urethane masks may also be used, such being prepared from diisocyanates, a linear polyester or polyether resin and a low molecular weight, curing agent such as a glycol or a diamine. The chemistry of urethane elastomers is more extensively discussed in Dombrow, Polyurethanes, Second Ed., Reinhold Publishing Corp., N.Y. (1965), Chapter 6.

The diisocyanate is first reacted with the polyester or polyether resin to give a prepolymer. When the mask is to be made the prepolymer is mixed with the curing agent and a body thereof applied over the regions to be masked, and the curing accomplished. This usually takes less than half an hour and the resulting masks may be similarly used and reused as described in relation to the masks of the example. Commercially available polysulfide-type liquid rubber (e.g., Thiokol, a trademark of Thiokol Chemical Corp.), prepared by the reaction of a polysulfide with an organic dichloride, for instance, di(chloroethyl) formal and trichloropropane with sodium polysulfide, cleaved with a reducing agent to yield a low-molecular weight branched polymer with terminal thiol groups, then cured with an oxidizing agent such as zinc oxide or organic peroxides, may also be used.

The terms setting and curing have been used herein to denominate an occurrence wherein material which had been pourable or could be troweled into place, has become gelled or congealed and has undergone sufficient crosslinking or vulcanization as to exhibit elastic behavior and exist in the rubber state. The term "catalyst" is used herein in the popular sense, as used in the art, to indicate the constituent which may be added to the pourable material in order to initiate gelling or congealing and crosslinking or vulcanization, even though the constituent may take part in, and be consumed in the reaction.

Since the term "rubber" has grown diffuse with the development of synthetic materials which attain the rubbery state, the term "rubbery polymer" is used herein to include "rubber" as the latter term is understood in the art.

Although the invention has been discussed herein primarily as an adjunct to an electroplating operation, it should be apparent that the selective masking process described could be advantageously used in instances where the plating or coating is accomplished by ways and means other than by electroplating, such as by anodizing, vacuum metalizing, or spray coating.

It should now be apparent that the molded reusable masking for selective coating, particularly electroplating as described hereinabove possesses each of the attributes set forth in the specification under the heading "Summary of the Invention" hereinbefore. Because the molded reusable masking for selective coating particularly electroplating of the invention be modified to some extent without departing from the principles of the invention as they have been outlined and explained in this specification, the present invention should be understood as encompassing all such modifications as are within the spirit and scope of the following claims.

What I claim is:

1. A process for coating selected regions of a plurality of similar parts comprising: flowing a liquid rubbery plastic material over one of said parts, except for said selected regions thereof, to a thickness of at least one-eighth inch thereon, congealing and curing said material to the rubbery state to form a mask which exposes said selected regions; coating said selected regions; removing the mask in an intact condition by elastically flexing said mask and moving it away from said one part; installing said mask about another of said similar parts so as to expose said selected regions thereof; elastically forcing said mask against said other part; coating said selected regions of said other part; and removing the mask in an intact condition from said other part by elastically flexing said mask and moving it away from said other part.

2. The process of claim 1 wherein the coating steps comprise: immersing said one part and said other part, with said mask thereon, in an electroplating bath and plating metal onto the exposed selected regions of said one part and said other part.

3. The process of claim 1 wherein the step of flowing said material onto said one part comprises: resting said one part on a surface, encompassing said one part with a sidewall spaced at least one-eighth inch therefrom, and pouring said material into the space between said one part and said sidewall.

4. The process of claim 3, further comprising, subsequent to congealing and curing of said material: cutting excess of said material away to expose selected regions covered by said material.

5. The process of claim 4, wherein said cutting includes cutting at least one window through said material to expose a selected region.

6. The process of claim 3, wherein the step of removing the mask from said one part includes cutting through said mask, in a thickness sense, from one end to the other between the exterior of said one part and the exterior of said mask; and on wrapping the mask from said one part by grasping the mask edges bounding the cut therethrough and moving said edges arcuately away from one another.

7. The process of claim 3 wherein the step of flowing said material onto said one part comprises pouring room temperature vulcanizing silicone rubber into the space between said one part and said sidewall and the step of congealing and curing said material consists of maintaining said material at room temperature until said material has acquired a durometer (Shore A) of about 65.

References Cited

UNITED STATES PATENTS

| | | | |
|---|---|---|---|
| 2,764,537 | 9/1956 | Bunch et al. | 204—15 |
| 3,159,555 | 12/1964 | Goody | 204—15 |
| 3,223,599 | 12/1965 | Taylor | 204—15 |
| 3,414,502 | 12/1968 | Porrata et al. | 204—15 |

ROBERT K. MIHALEK, Primary Examiner

T. TUFARIELLO, Assistant Examiner

U.S. Cl. X.R.

117—212